Sept. 5, 1950 J. H. HOMRIGHOUS 2,521,009

TELEVISION SYSTEM

Original Filed Feb. 24, 1943 4 Sheets-Sheet 1

INVENTOR.

John H. Homrighous

Sept. 5, 1950 J. H. HOMRIGHOUS 2,521,009

TELEVISION SYSTEM

Original Filed Feb. 24, 1943 4 Sheets-Sheet 2

INVENTOR.

John H. Homrighous

Sept. 5, 1950 J. H. HOMRIGHOUS 2,521,009

TELEVISION SYSTEM

Original Filed Feb. 24, 1943 4 Sheets-Sheet 3

INVENTOR.

John H. Homrighous

TELEVISION SYSTEM

Original Filed Feb. 24, 1943

4 Sheets-Sheet 4

INVENTOR.

John H. Homrighous

Patented Sept. 5, 1950

2,521,009

UNITED STATES PATENT OFFICE 2,521,009

TELEVISION SYSTEM

John H. Homrighous, Oak Park, Ill.

Original application February 24, 1943, Serial No. 476,897. Divided and this application October 9, 1945, Serial No. 621,250

10 Claims. (Cl. 178—6.8)

My invention relates to improvements in television communication systems.

One of the main objects of my invention is an improved method for synchronizing the scanning devices and other mechanisms used in television.

Another object of my invention is an improved means for developing synchronizing signals during the interval between scanned lines in a field and between the picture fields for controlling the scanning action at the transmitter and to modulate the carrier with the developed synchronizing signals during the interval between scanned lines and picture fields to thereby govern the scanning action at the receiving station.

Another object of my invention is to provide an improved method for controlling interlace scanning.

Another object of my invention is to provide improved modulating controls for transmitting video and sound signals alternately on the same carrier.

Another object of my invention is the provision of means for automatically governing the velocity of deflection.

Several methods for developing and transmitting control frequencies have been devised; for instance, control frequencies have been developed by tuned circuits and transmitted separately from the video frequencies either as a separate modulation on a separate carrier, or in the interval between successive picture fields. In my prior application, Patent No. 2,309,393 of January 26, 1943, control signals are combined with the picture signals in such manner, that both are transmitted and reproduced as picture or video signals; and in my prior application Serial No. 451,722 filed July 21, 1942, now Patent No. 2,398,641, issued April 16, 1946, single impulses or control signals are developed at the end of each line and at the end of each picture field, and these signals are modulated on the carrier during the interval between lines and the interval between picture fields to control the horizontal and vertical scanning action at the receiving station.

In my present invention, I employ similar means to that shown in my prior application Serial No. 451,722 for developing control pulses for triggering or stopping the horizontal and vertical deflection of the cathode ray.

This synchronizing system may be known as the "follow up system," that is, the receiving station is not driven into synchronism but follows the horizontal and vertical movements of the transmitting station. Also, since no tuned circuits are used in developing the synchronizing signals this system is very flexible and will respond to any number of lines per picture and also to the present television standard of thirty pictures per second as well as to twenty-four pictures per second for motion picture film.

In my prior application Serial No. 451,722, I develop interlace scanning by causing the cathode ray in the first horizontal line in alternate fields to be returned from its mid-location to its starting point. In my present invention I provide an improved method for accomplishing the same result.

Figure 1:
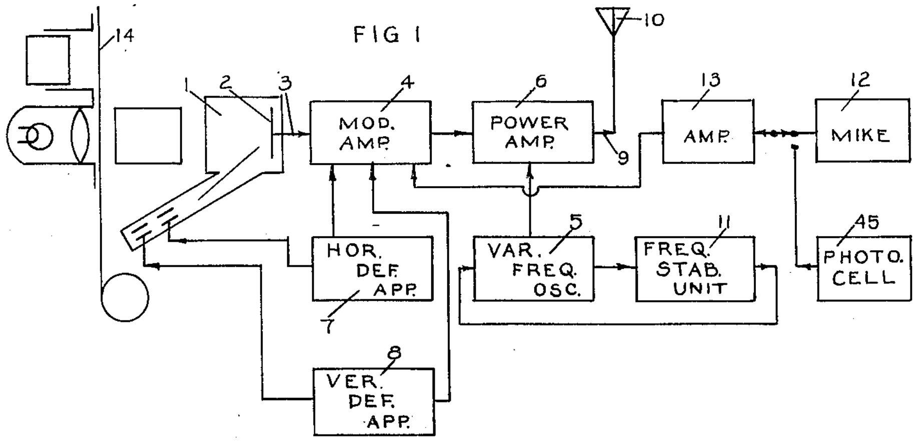
Figures 1 and 5 are simplified diagrammatic views of a television transmitting station, and a television receiving station, respectively, illustrating the principles applied in this invention.

In Figure 1, the numeral 1 designates a cathode ray transmitting tube of conventional type and is known as an "Iconoscope" or it may be a tube developed for perpendicular scanning of all points on the mosaic, and as illustrated it comprises a mosaic 2, photoelectric screen on which a light image of the object is projected and an electron gun for generating a ray of electrons directed at the screen, and two sets of deflecting plates for deflecting the electron ray at the line and field frequencies, so that it is caused to scan the screen. The picture is thereby developed and fed by an output connector 3 to a modulating amplifier 4.

A carrier wave is provided by an oscillator 5. In the power amplifier 6 this carrier wave is modulated by the frequency bank video or picture signals and also by synchronizing impulses from the horizontal deflecting apparatus 7 and the vertical deflecting apparatus 8 between the horizontal lines and between the image fields through the modulation amplifier 4. The signals from the amplifier 6 are supplied by a connection 9 to the antenna 10. The oscillator 5 may be controlled by a frequency stabilizing unit 11.

The control or synchronizing signals and the video signals are transmitted on the same carrier. Sound signals may be transmitted on a separate carrier, or the signals from the microphone 12 after suitable amplification at 13 may be modulated on the same carrier as the video signals between the picture signals and the control signals for each horizontal line.

The image may be projected onto the mosaic screen 2 directly from a scene, or the image may be projected onto the mosaic from a moving film 14 disposed as shown, which is given intermittent movement by suitable mechanism to project each picture frame separately.

Figures 2, 3:
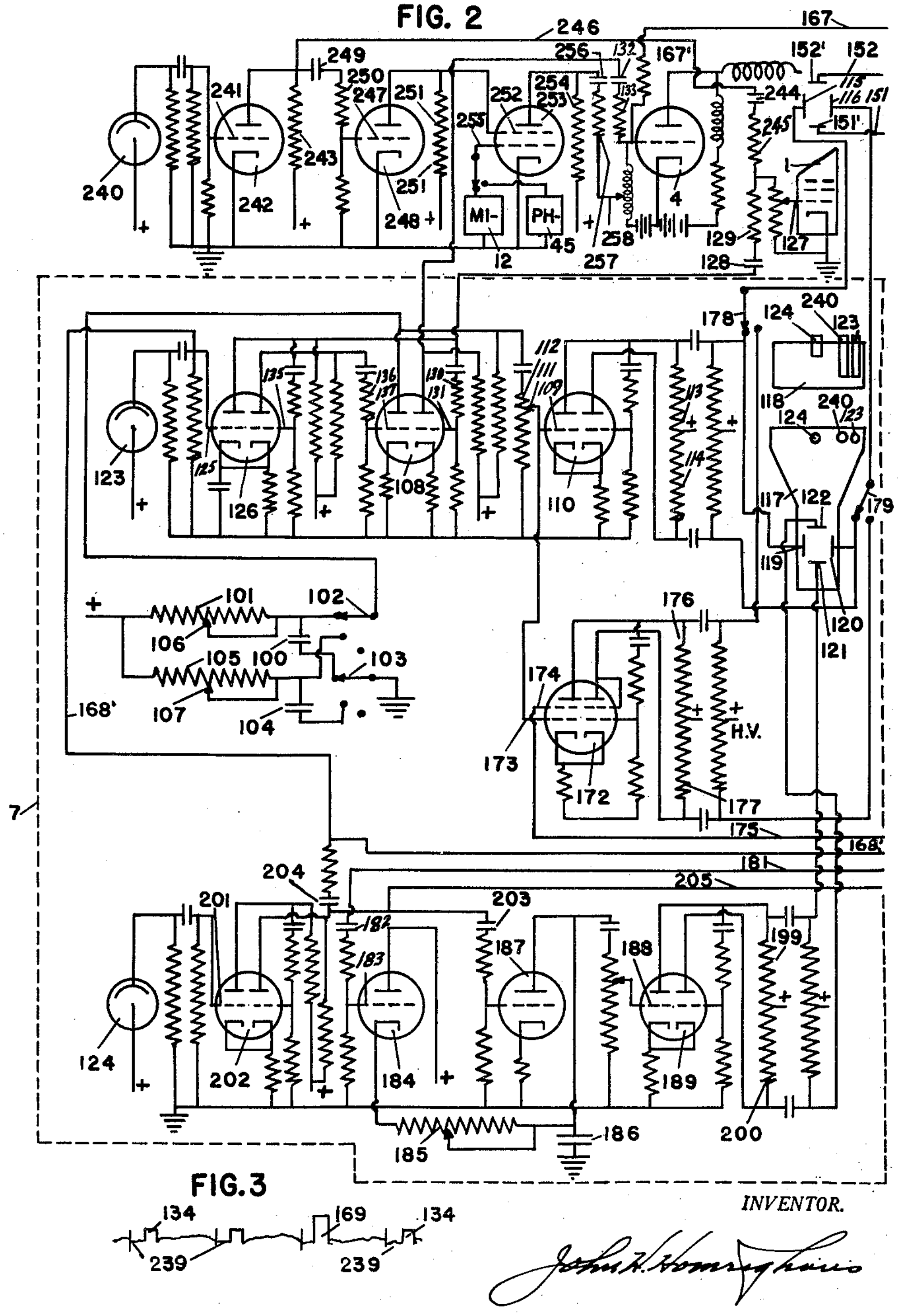
Figures 2 and 4 are circuit diagrams of the horizontal and vertical deflecting apparatus respectively, shown in Figure 1.
Figure 3 is a graphical view showing horizontal and vertical synchronizing impulses.

With reference to Figure 2, the apparatus 7 for horizontal deflection comprises a condenser 100 charged through an adjustable resistance 101 from a source of positive voltage as indicated. By movement of the switches 102 and 103 another condenser 104 may be charged through resistance 105 from a source of high voltage to supply a different line frequency for horizontal deflection. Charging current control may also be obtained by varying the resistances through movable contacts 106 and 107 to give close frequency adjustments. Further line frequency variations may be obtained by providing other resistances and condensers connected to the vacant switch contacts.

When the condenser 100 or 104 becomes charged, depending upon which switch contacts are closed, the saw tooth voltage wave in the plate circuit of tube 108 is impressed on the grid 109 of multiunit tube 110 through an adjustable contact 111 on the voltage dividing resistance 112 which contact is for controlling or adjusting the amplitude of the saw tooth voltage wave. The output of the push-pull amplifier 110 supplied to the load resistors 113 and 114 will change the potential on the horizontal deflecting plates 115 and 116 of tube 1 to effect in a well known manner the forward movement of the cathode ray. In order to increase the glow from the different degrees of shading in the images on film 75, light rays from a source of light 51 may be directed toward the film which momentarily increases the brilliancy of the various shadings or intensifies the glow.

To initiate the discharge of the condenser 100 or 104 I provide an auxiliary scanning device or a cathode ray tube 117 of conventional type similar to tube 1 except that it may be of smaller size and it may comprise a fluorescent screen 118 of rectangular shape, and an electron gun for developing a ray of electrons directed toward the screen. The control electrode of this tube is biased to produce a constant intensity electron ray. Two sets of electrostatic plates may be furnished, one set 119 and 120 to control the deflection of the electron ray lengthwise the screen, and another set 121 and 122 to control the deflection of the electron ray in a direction perpendicular to the length of the screen. Three photoelectric cells in separate evacuated bulbs are provided inside the cathode ray tube 117. One photocell 123 extends across the tube near one edge of the screen and another photocell 124 is placed near the center of the screen. The glass evacuated bulbs of these photocells may be coated with luminescent material similar to the screen in the cathode ray tube except that the coating on the photocells may have a shorter persistence time.

The deflecting plates 119 and 120 are connected in parallel to the deflecting plates 115 and 116 of tube 1 so that the cathode ray in both tubes travels across their respective screens in synchronism.

When the cathode ray tube 117 arrives at the edge of the screen having the photocell 123, the change of light in the photocell, due to the electron ray impinging the fluorescent material on the outside of the photocell causes a voltage impulse to be applied to the grid 125 of the double triode tube 126. The voltage change on the grid of tube 126 causes several things to happen: first, the signal after amplification in the anode circuit is applied to the control grid 127 of tube 1 through condenser 128 and resistance 129 to extinguish or lower the intensity of the electron ray during its backward movement or retrace period; second, this signal is applied through resistances 130 to grid 131 of tube 108 and after amplification in the anode circuit it is applied through the coupling condenser 132 and resistance 133 to the grid of the modulating video amplifier 4 for modulating the carrier with a high amplitude impulse during the backward movement of the electron ray or the retrace period as illustrated at 134, Figure 3, to thereby control horizontal deflection at the receiving stations; third, this signal is also applied to the second grid 135 of tube 126 and after amplification in its anode circuit it is then applied through resistance 136 to the grid 137 of the trigger tube 108. This tube then becomes conductive to discharge either of the connected condensers 100 or 104.

From the foregoing it will be understood that the photocell 123 initiates the cut off or horizontal return trace of the cathode ray, modulates the carrier with a high amplitude signal wave between horizontal lines, and also reduces the intensity of the electron ray in tube 1. Furthermore, line frequency may be varied to meet any operating condition through the adjustment of the variable resistances 101 and 105 and the condensers 100 and 104. The amplitude or width of the pattern scanned may be adjusted by the movable contact 111.

Figure 4:
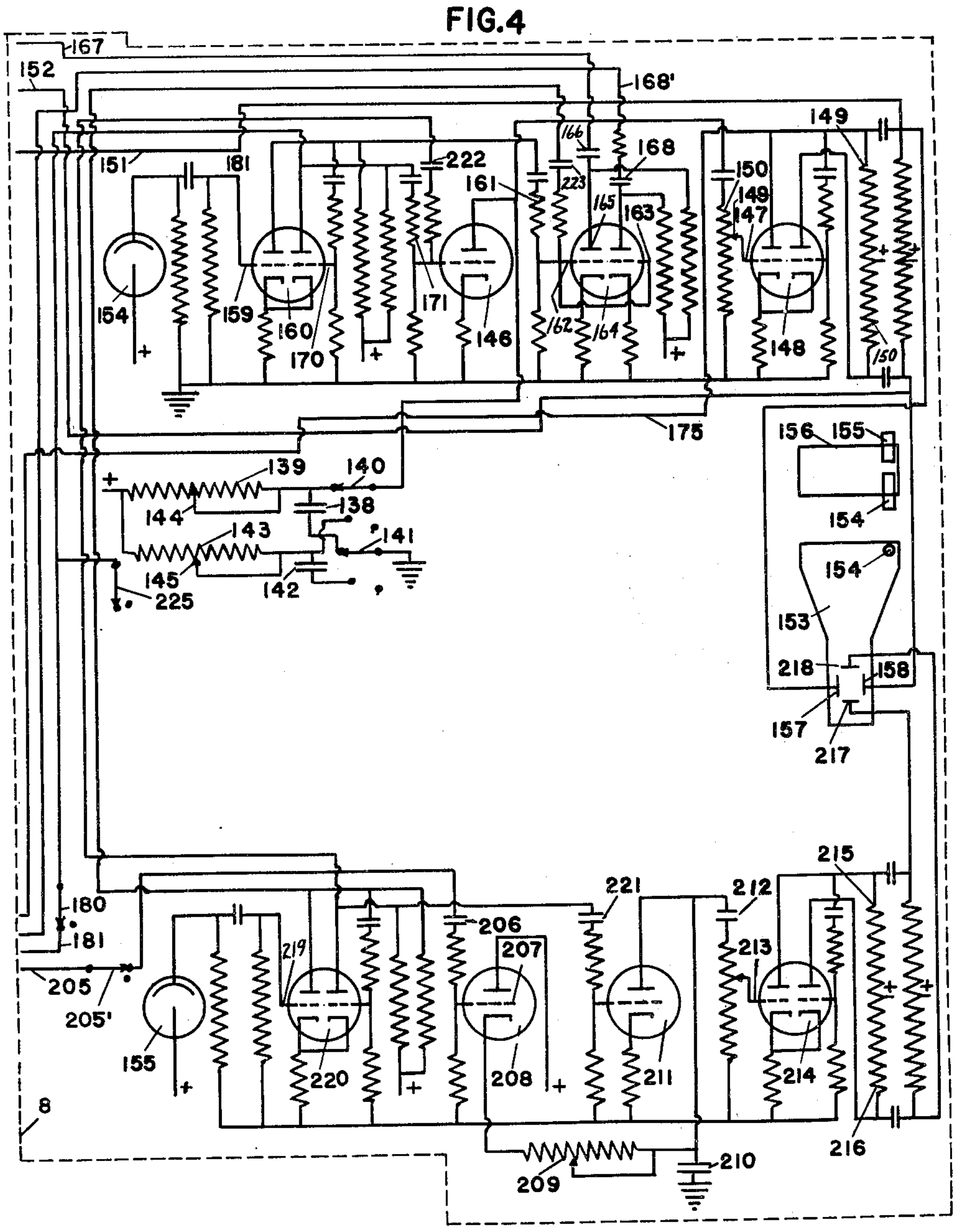

With reference to Figure 4, the vertical deflecting apparatus 8 is quite similar to the horizontal deflecting apparatus 7 and comprises a condenser 138 charged through an adjustable resistance 139 from a source of positive voltage as indicated. By rotating the switches 140 and 141 another condenser 142 may be charged through the resistance 143 from the source of high voltage to supply different predetermined frame or picture frequencies. Charging current control may also be obtained by varying the resistances 139 and 143 through the movable contacts 144 and 145, to give close frame frequency adjustments.

When the capacitances 138 or 142 become charged depending upon which contacts are closed, the saw tooth voltage wave in the anode circuit of tube 146 is impressed on the grid 147 of the double unit tube 148 through an adjustable contact 149 on the voltage dividing resistance 150 which contact is for controlling or adjusting the amplitude of the saw tooth voltage wave. The output of the push pull amplifier tube 148 supplied to the load resistances 149 and 150 will change the potential via conductors 151 and 152 on the vertical deflecting plates 151′ and 152′ of tube 1 to effect the forward movement of the electron ray.

To initiate the discharge of condenser 138 or 142 I provide an auxiliary vertical scanning device or cathode ray tube 153 of conventional type and similar to tube 117 previously described, except that it has two photocells 154 and 155 in separate evacuated bulbs extending inside of the tube 153 and near the cathode ray leaving edge of the screen 156.

The plates 151′ and 152′ are connected in parallel to the deflecting plates 157 and 158 respectively in tube 153, so that the movement of the electron ray across their respective screens will be in synchronism.

When the electron ray of tube 153 arrives at the edge of the screen having the photocell 154, the change in intensity of light to the cell caused by the electron ray impinging the fluorescent material on the outside of the photocell bulb will cause a voltage impulse to be applied to the grid 159 of the double triode tube 160. The voltage change on the grid of tube 160 initiates three conditions: first, the signal after amplification in the plate circuit is applied through resistance 161 to the grids 162 and 163 of the double triode 164 after suitable amplification the signal is supplied from anode 165 to coupling condenser 166, conductor 167, resistance 167' to the grid of modulation amplifier 4 for modulating the carrier with a high amplitude impulse between picture fields or during vertical retrace. The second condition is as follows: the signal amplified in the second plate circuit of tube 164 is applied through coupling condenser 168, conductor 168' to the grid of tube 126 in the horizontal deflecting apparatus 7 to cause, as previously explained, the return of the electron ray to its horizontal starting position, lowering the intensity of the electron ray, and modulating the carrier with a high amplitude signal in synchronism with the modulating signal from the tube 164. The modulation of the carrier with two signals of large amplitude in synchronism will produce a signal having an amplitude greater than either of the signals alone, as illustrated at 169, Figure 3. The third condition is as follows: the signal on grid 159 after amplification is also applied to the grid 170 of tube 160 and after suitable amplification in its anode circuit it is applied through resistance 171 to the grid of the trigger tube 146. This tube then becomes conductive to discharge either of the condensers 138 or 142.

When certain types of camera tubes are used such as illustrated in Figure 1 it may be necessary to make corrections in the horizontal line deflection for the "Keystone" effect and in order to do this I provide a push-pull amplifier screen grid tube 172, Figure 2, having a control grid 173 connected in parallel to the grid 109 of the amplifier 110. The screen grid 174 is connected by a conductor 175 to the load resistor 149 to gradually vary the tube output in accordance with the field deflection. The output of the push-pull amplifier 172 supplied to load resistances 176 and 177 will now change the potential on the horizontal deflecting plates 115 and 116 through the switches 178 and 179 to correct for unequal amplitudes for horizontal scanning when a pick up tube having its image plate inclined to the scanning beam is used at the transmitter.

From the foregoing it will be understood that the photocell 154 initiates the return of the electron ray both vertically and horizontally to its starting point between fields, modulates the carrier with a high amplitude pulse between fields or picture frames, and also lowers the intensity of the electron ray between fields, simultaneously during the retrace period. Furthermore, line and frame frequency may be varied to meet any operating condition such as twenty-four or thirty pictures per second. By observing the sweep or otherwise timing the cathode ray in tube 153 it may be adjusted through the variable resistances 139 and 143 and the condensers 138 and 142 to operate at a particular frequency while the amplitude may be adjusted by the movable contact 149 to give the desired height scanned on the mosaic or to cut off the vertical deflection at any desired number of lines per field.

To provide interlace scanning, where the lines of one field fall in between the lines of the previous field, some means for delaying the line scanning in alternate fields must be provided since the field retrace control pulse also returns the horizontal movement of the cathode ray to its starting point which will cause the electron ray to travel in almost a vertical direction during retrace instead of backward and forward across the image screen.

In order to accomplish the above method of interlace, where the number of lines per frame, and the number of frames per second may be varied as desired, I employ apparatus to deflect momentarily the electron ray in the scanning control devices for exciting other photoelectric cells in the scanning devices to thereby control the horizontal deflection so that the first line in alternate fields will only be one half the length of the other scanned lines, which will have the effect of moving the electron ray in the camera tube vertically in alternate fields a distance of one half of the space between lines.

With further reference to Figure 4, to control interlace scanning, a voltage pulse is developed each time that the photocell 154 is excited to initiate the return of the electron ray to its starting point in the second anode circuit of tube 160, and applied through the switch 180, conductor 181, condenser 182, to the grid 183 of tube 184, Figure 2. This positive pulse on the grid of tube 184 allows current to flow through resistance 185 momentarily to charge the condenser 186. This causes a voltage change in the plate circuit of tube 187 which is impressed on the grid 188 of the double triode tube 189. The output from the amplifier tube 189 is supplied to the load resistors 199 and 200 to alter the potential on the deflecting plates 121 and 122 of the scanning control tube or device 117 to deflect the electron ray in a direction perpendicular to the length of the screen. This small deflection of the cathode ray in tube 117 will only be for a short time, since the cathode ray during its first horizontal movement after vertical retrace will impinge the fluorescence coating on the photocell 124 located approximately in the middle of the screen but normally out of the path of the cathode ray. The change of light in this photoelectric cell causes a voltage impulse to be applied to the grid 201 of the double triode amplifier 202. The voltage change on the grid of tube 202 causes several things to happen: first, the signal or voltage impulse after amplification in the second anode circuit is applied through coupling condenser 204, conductor 168' to the grid 125 of tube 126 thus causing the cathode ray of tube 1 and 117 to return to their starting points as previously described but, after only one half of the distance of a horizontal line was scanned, which will have the effect of locating successive scanned lines in between the scanned line locations of the previous field; third, the signal or impulse from the second anode circuit of tube 202 is also applied over conductor 205, through switch 205' and coupling condenser 206 to the grid 207 of tube 208. This positive pulse on the grid of tube 208 allows current to flow through resistance 209 momentarily to charge the condenser 210, this causes a voltage change in the plate circuit of tube 211 which is applied through blocking condenser 212 to the grid 213 of the double amplifier tube 214. The output from the amplifier tube 214 is supplied to the load resistances 215 and 216 to change the potential on the deflecting plates 217 and 218 of the scanning control tube of device 153 to deflect the electron ray in a direction perpendicular to the length of the screen. This deflection of the cathode ray will cause it to impinge the fluorescent coating on the photocell 155 instead of the photocell 154 at the end of the vertical deflection. The change of light in the photocell 155 causes a voltage impulse to be applied to the grid 219 of the double triode amplifier 220. The voltage change on the grid of tube 220 causes several things to happen: first, the signal or voltage impulse after amplification in the anode circuits is applied to the grid of the trigger tube 211 through the blocking condenser 221. This tube then becomes conductive to discharge the condenser 210 thus restoring the cathode ray in tube 153 to its normal position; second the signal is applied through coupling condenser 222 to the grid of trigger tube 146 and also the signal is applied through coupling condenser 223 to the grid 162 of tube 164 thus causing the cathode ray in tubes 1 and 153 to return to their starting points as previously described.

From the above description it is shown that the scanning cycle will keep repeating, that is, the cathode ray in the vertical scanning control device 153 will alternately excite the photocell 154 and 155 to cause vertical retrace etc. and each time that the photocell 154 is excited it causes the photocell 124 in the line control device 117, Figure 2, to become excited, thereby causing the line locations scanned on the image plate in alternate fields to fall in between the line locations scanned in the intervening fields. The switches 180 and 205' would be opened for progressive scanning.

Sound signals may be transmitted on a separate carrier; however, I prefer to modulate the sound signals on the same carrier with the video signals but each having a separate period of time. In order to accomplish this the scene may be focused toward one side of the image plate leaving a small narrow space for sound at the cathode ray leaving edge of the image plate or mosaic, as illustrated at 139, Figure 3. This requires some means of automatically stopping or cutting off modulation of the video signals before the cathode ray reaches the edge of the image plate and at the same instant to start modulating the carrier by sound signals. To effect the change from modulating the carrier with video signals to modulating the carrier with sound signals or vice versa I employ a third photoelectric cell 240 located in the cathode ray scanning device 117 so that the cathode ray will impinge its outer coating of luminescent material once for each horizontal line for a short period of time before impinging the photocell 123. This causes an increase of intensity of light in the photocell 240, thereby increasing the potential on the grid 241 of the tube 242 causing a voltage drop in the load resistance 243 which is applied through condenser 244 and resistance 245 and conductor 246 to the control grid 127 of the cathode ray pick up tube 1 to extinguish or lower the intensity of its cathode ray whereby video signals will not be developed during the interval of increased light in the photocell 240. The voltage drop in the load resistance 243 is also applied to the grid 247 of the tube 248 through the condenser 249 and resistance 250. The tube 248 is biased so that normally current will flow through its load resistance 251 producing a large voltage drop. This low voltage is applied to the screen grid 252 of amplifying tube 253. The normal low positive voltage applied to the grid 252 is considerably below the positive voltage applied through load resistance 254 to the anode and is of such value that it normally nullifies the conductivity of the tube 253 during the period that the video signals are being modulated on the carrier. However, the negative pulse applied to the grid 247 of tube 248 is of sufficient value to stop the flow of current through the tube, thereby increasing the potential on the screen grid 252 whereupon the microphone 12 or photocell 45 may vary the potential on the control grid 255 to vary the output of tube 253 in accordance with sound vibrations. The variable output voltage is applied through condenser 256 and resistance 257 and conductor 258 to the input circuit of modulation amplifier 4 to modulate the carrier with sound signals between the video signals and the synchronizing pulses. Therefore, video and sound signals are modulated on the same carrier at different intervals.

Figure 5:
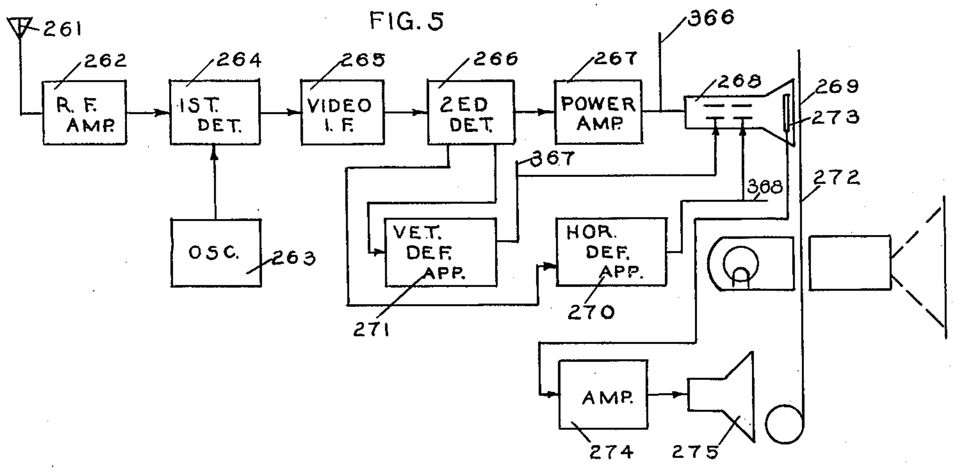

With reference to Figure 5, showing a receiving station, the antenna 261 receives the carrier signals from the transmitter antenna 10 to a radio frequency amplifier 262. An oscillator 263 reacts with these signals in the first detector stage 264 on the superheterodyne principle to produce an intermediate frequency which is supplied to the video intermediate frequency stage 265. After suitable amplification the video signals and the control signals are detected at 266 and applied to the power amplifier 267 and after amplification in this tube they are applied to the picture tube or scanning device 268. The device 268 is represented as being in the form of a cathode ray tube of a conventional type and comprises a fluorescent screen 269, an electron gun for developing a ray of electrons directed at the screen, and two sets of electrostatic plates for deflecting the electron ray at the line and field frequencies to cause it to scan the screen. The video signals are applied to the control electrode of the electron gun, whereby, the intensity of the electron ray is made to vary with the video or picture signals. The horizontal deflecting apparatus 270 receives the line synchronizing impulses from the second detector output, and the vertical deflecting apparatus 271 likewise receives its control signals from the output of the second detector.

The images from the screen 269 may be impressed on a luminescent coated film or rotating member 272 disposed as shown which may be given an intermittent movement by suitable mechanism in front of a suitable lamp to project each picture separately.

Sound signals may be transmitted on a separate carrier or they may be transmitted as part of the video signals as shown in my prior application mentioned above. In my present invention the sound signals may be transmitted on the same carrier as the video signals but during an interval between the picture signals and the control or synchronizing signals. A photoelectric cell 273 preferably placed on the inside of the cathode ray tube arranged at one side of the tube and having a coating of luminescent material with a rather fast decay period, so that the sound signals at the end of each horizontal line will cause various degrees of light intensities in the photocell 273 to vary its signal current output. These variations in signals after amplification at 274 are reproduced as sound at the speaker 275.

Figure 6:
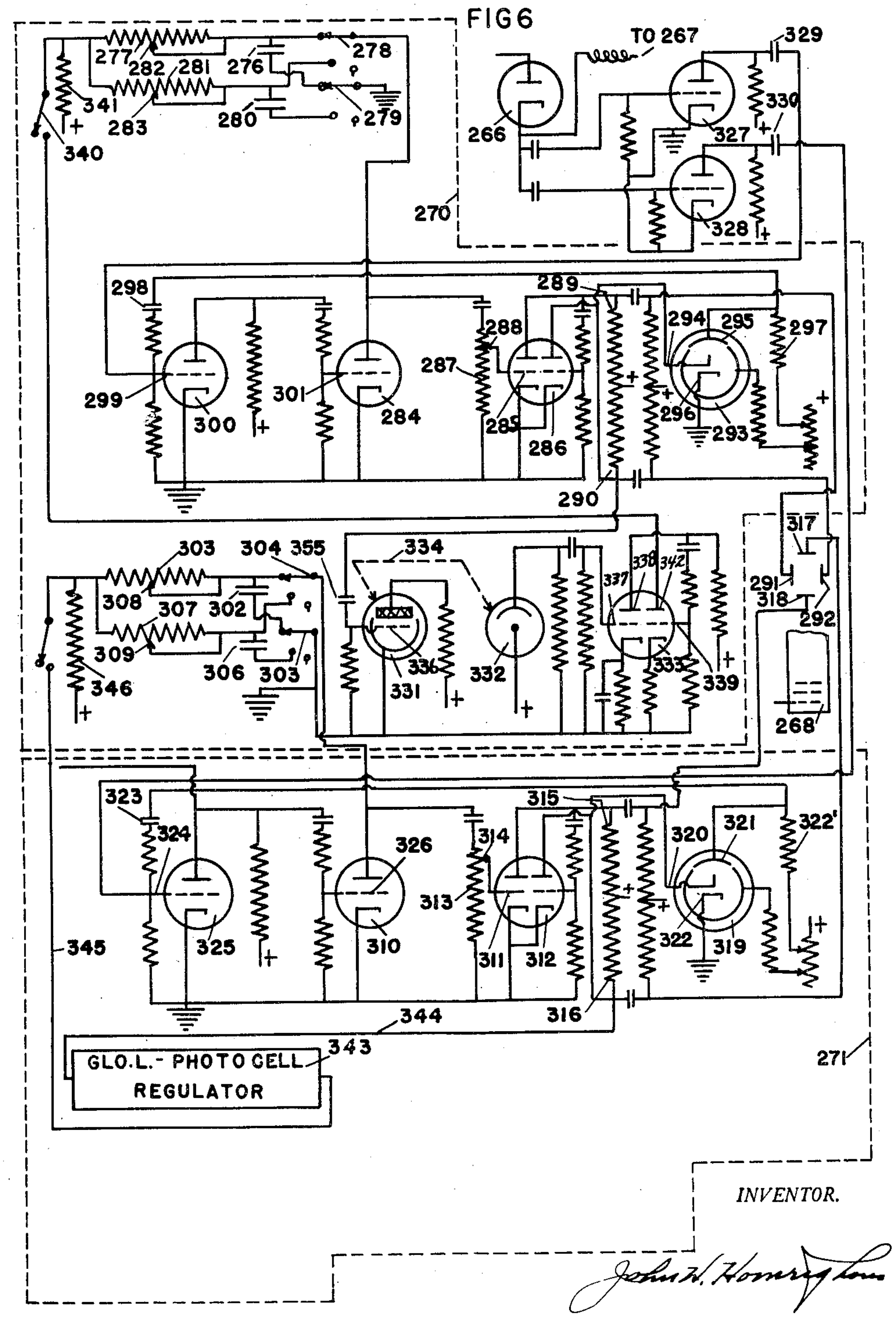
Figure 6 is a circuit diagram of the horizontal and vertical deflecting apparatus illustrated in Figure 5.

With reference to Figure 6, the deflecting apparatus 270 and 271 are very similar to that described for the transmitter. The apparatus 270 for horizontal deflection at the receiver, comprises a condenser 276 charged through a variable resistance 277 from a positive source of potential as indicated. By adjusting the switches 278 and 279 other condensers such as 280 may be charged through other resistances such as 281 from a source of high potential to supply different line frequencies for horizontal deflection. Charging current control may be obtained by varying the resistance through movable contacts 282 and 283 to give close frequency adjustments.

When the voltage across condenser 276 gradually increases or the condenser 280 depending upon which switch contacts are closed, the saw tooth voltage wave in the plate circuit of tube 284 is impressed on the grid 285 of the double purpose tube 286 through a voltage dividing resistance 287 and the adjustable contact 288 for controlling the amplitude of the saw tooth voltage waves. The output of the double purpose amplifying tube 286 is applied to the load resistances 289 and 290 to change the potential on the horizontal deflecting plates 291 and 292 of tube 268 to effect the forward movement of the cathode ray.

To initiate the discharge of condensers 276 or 280 in the absence of signal I provide an "off and on" electron relay tube 293. This tube has been described in my prior application Serial No. 472,105, filed January 12, 1943, now Patent No. 2,437,027, granted March 2, 1948. The tube 293 may comprise a control electrode 294 for deflecting the electrons to and from the anode 295.

When the voltage at the load resistance 290 is increasing the potential on control electrode 294 will also increase until its potential is approximately the same as the potential of the anode 295. This will cause the electrons to flow from the cathode 296 to the anode 295 thus lowering the potential at the load resistance 297 which is applied through condenser 298 to the grid 299 of tube 300. This change in potential after amplification in tube 300 is applied to the grid 301 of trigger tube 284. This tube then becomes conductive to discharge the condenser 276 returning the electron ray in tube 268 to its line starting position. Discharging the condenser 276 also decreases the potential at load resistance 290 thus lowering the potential of the control electrode 294 thereby causing the deflection of the electrons from the anode 295.

With further reference to Figure 6, the vertical deflecting apparatus 271 is similar to the horizontal deflecting apparatus 270, and comprises a condenser 302 charged through a variable resistance 303 from a source of positive potential as indicated. By rotating the switches 304 and 305 another condenser 306 may be charged through a resistance 307 from the source of positive potential to thereby supply different frame or picture frequencies. Charging current control may also be obtained by varying the resistances through the movable contacts 308 and 309 to give close frame frequency adjustments.

When the voltage across the condenser 302 increases the saw tooth wave in the plate circuit of tube 310 is impressed on the grid 311 of tube 312 through the resistance 313 and the adjustable contact 314 for controlling the amplitude of the vertical saw tooth wave. The output of double purpose amplifier tube 312 is applied to the load resistances 315 and 316 to increase and decrease the potential on the vertical deflecting plates 317 and 318 of tube 268 to effect the vertical movement of the electron ray.

To initiate the discharge of the condensers 302 or 306 in the absence of control signals I provide an "off and on" relay tube 319 similar to tube 293 which may comprise a control electrode 320 for deflecting the electrons to and from the anode 321.

When the voltage at the load resistance 316 is increasing the potential on the control electrode 320 will also increase until its potential is approximately equal to the potential on the anode. This will cause the electrons to flow from the cathode 322 to the anode 321 thus lowering the potential at the load resistance 322′ momentarily which is applied through the condenser 323 to the grid 324 of tube 325. This impulse after amplification in tube 325 is applied to the grid 326 of the trigger tube 310. This tube then becomes conductive to discharge condenser 302, returning the electron ray in tube 268 to its frame start position. Discharging the condenser 302 also decreases the potential at load resistance 316 thus lowering the potential of the control electrode 320 thereby causing the deflection of the electrons from the anode 321.

From the foregoing it will be understood that in the absence of signals, due to fading, or in turning the receiver on when there is no transmitter operating, that the electron ray in the tube 268 will oscillate both horizontally and vertically.

The video and control signals are demodulated at the second detector or rectifying tube 266. These signals are applied to the power amplifier 267 and after suitable amplification they are impressed on the control grid of the picture tube 268. Since the control or synchronizing signals are of a greater amplitude than the picture signals and appear at the end of each line and at the end of each field, they may be used to blank or reduce the intensity of the cathode ray in the viewing tube during the retrace period.

The control signals from detector tube 266 are also applied to the grids of tubes 327 and 328. The tube 327 for controlling the horizontal deflection period is biased so that the picture signals will not produce anode current, but it does respond to both the line and field synchronizing pulses to thereby apply a voltage impulse through the coupling condenser 329 to the grid 299 of tube 300. After suitable amplification in its anode circuit the signal is applied to the grid 301 of the trigger tube 284 to cause the discharge of condenser 276 thereby returning the electron ray of tube 268 to its starting point.

The tube 328 is biased to eliminate both the picture signals and the horizontal synchronizing impulses, but it will respond to the high amplitude synchronizing pulses to impress a potential impulse through the coupling condenser 330 to the grid 324 of tube 325. This tube will function as previously described to discharge the condenser 302 thereby returning the cathode ray in tube 268 to the starting point of the next field.

From the foregoing it is to be understood that the cathode ray in the receiving tube will be returned to either its horizontal line starting point or the starting point of the next field from any location on the screen upon the reception of a control or synchronizing signal. In other words, the horizontal control signals will return the electron beam to the starting point for the next line, and the vertical control signal will return the electron ray to the starting point of the first line in the next succeeding field.

The amplitude for the horizontal and vertical deflection is adjusted by the movable contacts 282 and 308 to adjust the sweep of the cathode ray across the fluorescent screen 269. The voltage on the anodes 295 and 321 may be adjusted to give considerable voltage drop in the load resistances 297 and 322' when the cathode ray reaches the leaving side of the screen 269 or when it reaches its limit of travel due to the amplitude adjustment.

The operation of the receiver is as follows: when the receiver is energized, upon closing the power supply circuit the cathode ray will oscillate or travel forward and backward horizontally and vertically by deflecting potentials developed by charging the condensers 276 and 302 and discharging these condensers by the cut off devices or tubes 293 and 319. However, upon the reception of synchronizing signals, interposed between lines and between picture fields, the line deflecting apparatus will function upon the reception of the horizontal control pulse to return the cathode ray to start the next line in synchronism with the transmitter. Upon the reception of the first vertical control pulse the vertical deflecting apparatus will operate to return the electron ray to start the first line of the next succeeding field. Therefore the receiver will be automatically synchronized with the transmitter upon the reception of the first vertical synchronizing impulse, and the line deflection will be in step with the transmitter upon the reception of the first horizontal control impulse.

Synchronism is accomplished by transmitting a control signal during each retrace period of the cathode ray in the pick up tube and utilizing this control signal at the receiver to return the cathode ray in the viewing tube to its starting point for the next forward movement.

In order to automatically control or regulate the scanning frequencies at the receiver and to care for slight irregularities in the transmitted control signals I employ a regulator comprising a glow lamp 331, a photocell 332, and a double purpose tube 333. The glow lamp 331 and photoelectric cell 332 may be mounted in separate lightproof containers arranged in such a manner that the light from the glow lamp will be directed toward the photocell as indicated by the dotted line 324.

The operation of the regulator is as follows: as the voltage at the load resistance 290 is increasing to move the electron ray horizontally forward, this increasing potential is also applied through condenser 335 to the grid 336 of the glow lamp 331. This will gradually increase the current through the glow lamp to cause it to glow more brilliantly. The variable light intensities from the glow lamp 331 are directed toward the photocell 332 as previously explained, and as the brilliancy increases the potential on the grid 337 is increased. The grid 337 is biased so that current will only flow in its plate circuit during the high amplitude of the saw tooth voltage wave or for a small distance of travel of the electron ray at the leaving edge of the screen. The potential change at the anode 338 is applied to the grid 339 causing a decrease of current through its anode, switch 340 and common load resistance 341. The charging resistance 277 and condenser 276 are connected in parallel with the resistance of the second set of elements of tube 333 comprising the anode 342. Therefore an increase in the resistance of the anode 342 circuit will cause a decrease in the charging current through the resistance 277 thereby slightly decreasing the frequency of deflection.

In operation the horizontal line frequency is adjusted slightly slower than the transmitter frequency which will cause the cut off or discharge of condenser 276 a short interval before the electron ray arrives at the leaving edge of the screen or picture, which means that the saw tooth wave did not reach its peak amplitude. Therefore the glow lamp would be slightly dimmed causing a higher current value through the resistance 277. Should the frequency at the receiver become too high the glow lamp would develop a greater intensity of light thus reducing the current flow through resistance 227.

From the above description it will be seen that this regulator will tend to stabilize the horizontal scanning frequency at the receiver. While I have not shown the specific circuits to regulate or stabilize the vertical scanning frequency, I have shown a block diagram 343 to represent a similar regulator circuit arrangement comprising a glow lamp, photocell and double purpose amplifier and it is to be understood that this regulator 343 will operate to automatically control or regulate the vertical sweep frequency in a manner similar to that described above for horizontal regulation over the conductors 344 and 345 and through common resistance 346.

The cut off devices or the "off and on" electron relay tube 293 and 319 may be considered as a safety device so that the electron ray in tube 268 will continue to oscillate should the signals fade, or the transmitting station go off the air. With the reception of strong signals these tubes do not cause the return of the electron ray to its starting point. However, when monitoring on a transmitter using other forms of synchronizing signals the voltage on tubes 293 and 319 may be adjusted to return the electron ray in synchronism with the transmitter without utilizing any transmitted control signals.

To monitor on a television channel without utilizing at the receiver any of several different synchronizing or control signals that may be transmitted, assuming that the scanning frequencies are reasonably stable, adjust at 288 and 314 the amplitude of the saw tooth waves or the sweep of the electron ray to scan a slightly smaller area than normal and employing the tubes 293 and 319 to develop cut off signals. Then adjust the horizontal and vertical frequencies at 282 and 308 so that the reproduced picture will have a narrow black line or border on the right and bottom edges. This mark is caused by blanking signals between lines and between fields. The black lines at the leaving edges of the screen will indicate when the receiver has been adjusted for the proper scanning frequencies as any deviation in the size of the reproduced picture would show that receiver was operating slow or fast.

Figure 7:
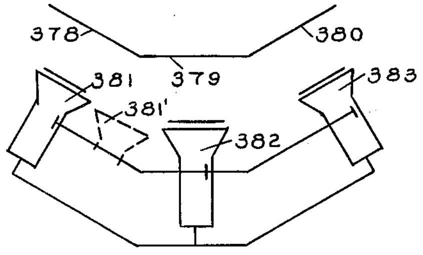
Figures 7 and 8 are diagrammatic views of the arrangement of picture tubes projecting motion pictures to several screens simultaneously.
Figure 8:
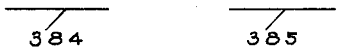

Referring to Figures 7 and 8, I illustrate two arrangements that may be utilized in projecting pictures in theatres to two or more screens. In present day motion picture theatres the pictures are projected to only one large screen with the result that the pictures seen by the patrons close to either wall will be very much distorted. To overcome this distortion I employ three large screens 378, 379 and 380 in Figure 7 and each served by a separate projecting device as described above in connection with Figure 5 and as illustrated by the reference numerals 381, 382 and 383. Since these devices are in multiple the same pictures will be shown simultaneously on the three screens and the patrons near the sides of the house will see the picture as distinctly as those in the middle section.

With further reference to Figure 7 I also employ two projecting devices such as 381' and 382 for projecting the same pictures to a single screen but focused slightly differently at the screen; that is, 381' may be focused slightly in front of and slightly to one side of the image projected by the other device 382 to give the illusion of depth to the picture.

Figure 8 shows a different arrangement of large screens 384 and 385 in a theatre so that a greater number of patrons may view undistorted pictures. Furthermore many different arrangements of the screens may be employed to serve larger groups of people; for instance, the stage may be set in the center of an ampitheatre with the pictures showing on four or six different screens simultaneously.

In the various circuits shown and described I have simplified the drawings by indicating the source of potential by a positive or negative sign. Also I have omitted the heater filaments for the various tubes, but it will be understood that such filaments would be necessary.

The embodiments of the invention which have been given herein are illustrations of how the various features may be accomplished and the principles involved. It is to be understood that the invention contained herein is capable of embodiment in many other forms and adaptations, without departing from the spirit of the invention and the scope of the appended claims.

This invention is a division of application Serial Number 476,897, filed February 24, 1943.

Having thus described my invention, I claim:

1. In a television system, a cathode ray camera tube having a screen and an electron ray directed at an angle toward the screen, means including saw tooth wave generators and an electron tube controlled thereby to cause the electron ray to scan lines of equal length on said screen, through a keystone area in a plane at an angle to the surface of said screen, to produce picture signals, means to transmit said signals, a receiver to receive said signals having at least two cathode ray picture tubes, each of the said picture tubes having an image screen and an electron beam directed toward its screen, deflecting means including a pair of condensers repeatedly charged from a source of current to produce saw tooth waves, means under control of the said saw tooth waves to cause the electron beam in each of said picture tubes to scan its associated screen to produce thereon images from said picture signals, and electrically operable means under control of said saw tooth waves to control the charging current for said condensers to maintain the scanning speed of the electron beam substantially constant.

2. In a television system, a cathode ray camera tube having an image screen and an electron ray directed at an angle toward the screen, means including saw tooth wave generators and an electron tube controlled thereby to cause the electron ray to scan lines of equal length on said screen to produce picture signals, means to transmit said signals, a receiver to receive said signals having a cathode ray picture tube, said picture tube having an image screen and an electron beam directed toward its screen, deflecting means including a pair of condensers repeatedly charged from a source of current to produce saw tooth waves, means under control of said saw tooth waves to cause the electron beam to scan the said picture tube screen to produce thereon images from said picture signals, and electrically operable means under control of certain of the said saw tooth waves to control the charging current for one of said condensers to maintain the horizontal or vertical scanning speed of the electron beam substantially constant.

3. In a television system, a transmitter, a first cathode ray tube associated with said transmitter, said tube having an image screen and a first electron ray directed toward the screen, first generator means including a first auxiliary scanning device to produce line saw tooth waves including line synchronizing pulses to control the intervals of the line saw tooth waves, second generator means including a second auxiliary scanning device to produce frame saw tooth waves including frame synchronizing pulses to control the intervals of the frame saw tooth waves, means under control of said line and frame saw tooth waves to cause the electron ray to scan successive frames on said screen to produce picture signals representative of a scene, said first scanning device having means under control of said frame pulses to produce additional line synchronizing pulses for reducing the interval of the first line saw tooth wave in alternate frames to cause the electron ray to scan odd and even lines on said screen in alternate and intermediate frames respectively, means to transmit said picture signals and said line and frame syncronizing pulses, a receiver to receive said picture signals and said line and frame synchronizing pulses, a second cathode ray tube associated with said receiver, said second tube having a fluorescent image screen and a second electron ray directed toward the fluorescent screen, means including a line saw tooth generator under control of said received line syncronizing pulses to produce other line saw tooth waves for deflecting the second electron ray forward and backward horizontally to scan lines on said fluorescent screen, means including a frame saw tooth generator under control of said received frame synchronizing pulses to produce other frame saw tooth waves for deflecting the second electron ray forward and backward vertically to scan successive frames on said fluorescent screen to produce images thereon from the said received picture signals, said line saw tooth generator comprising a condenser repeatedly charged through an impedance from a source of current, a first electron tube connected to said impedance, and means including at least two electron control tubes responsive to changes in amplitude of said other line saw tooth waves to control current flow through said first tube thereby varying the charging current applied to said condenser to maintain the forward horizontal speed of the second electron ray substantially constant.

4. In a television system, a transmitter, a first cathode ray tube associated with said transmitter, said tube having an image screen and a first electron ray directed toward the screen, first generator means including a first auxiliary scanning device to produce line saw tooth waves including line synchronizing pulses to control the intervals of the line saw tooth waves, second generator means including a second auxiliary scanning device to produce frame saw tooth waves including frame synchronizing pulses to control the intervals of the frame saw tooth waves, means under control of said line and frame saw tooth waves to cause the electron ray to scan successive frames on said screen to produce picture signals representative of a scene, said first scanning device having means under control of said frame pulses to produce additional line synchronizing pulses for reducing the interval of the first line saw tooth wave in alternate frames to cause the electron ray to scan odd and even lines on said screen in alternate and intermediate frames respectively, means to transmit said picture signals and said line and frame synchronizing pulses, a receiver to receive said picture signals and said line and frame synchronizing pulses, a pair of cathode ray picture tubes associated with said receiver, each of the said picture tubes having a fluorescent image screen and an electron beam directed toward its associated fluorescent image screen, means including a line saw tooth generator under control of said received line synchronizing pulses to produce other line saw tooth waves for deflecting said electron beams forward and backward horizontally to scan lines on said fluorescent screens, means including a frame saw tooth generator under control of said received frame synchronizing pulses to produce other frame saw tooth waves for deflecting the said electron beams forward and backward vertically to scan successive frames to produce like images simultaneously on both of the said fluorescent screens from the said received picture signals, said line saw tooth generator comprising a condenser repeatedly charged through an impedance from a source of current, a first electron tube connected to said impedance, and means including electron control tubes responsive to changes in amplitude of said other line saw tooth waves to vary the current flowing through said impedance to maintain the forward horizontal speed of said electron beams substantially constant.

5. In a television system, a transmitter, a cathode ray tube associated with said transmitter, having an image screen and an electron ray directed toward the screen, line generator means including a first auxiliary scanning device to produce line saw tooth waves including line synchronizing pulses to control the intervals of the line saw tooth waves, frame generator means including a second auxiliary scanning device to produce frame saw tooth waves including frame synchronizing signals to control the intervals of the frame saw tooth waves, means under control of said line and frame saw tooth waves to cause the electron ray to scan successive frames on said screen to produce picture signals representative of a scene, said first scanning device having means under control of said frame pulses to produce additional line synchronizing pulses for reducing the interval of the first line saw tooth wave in alternate frames to cause the electron ray to scan odd and even lines respectively in alternate and intermediate frames on said screen.

6. In a television system, a receiver to receive picture signals, line synchronizing pulses and frame synchronizing pulses, a cathode ray tube associated with said receiver, said tube having an image screen and an electron ray directed toward the screen, means including a line saw tooth generator under control of said received line synchronizing pulses to produce line saw tooth wave for deflecting the electron ray forward and backward horizontally to scan lines on said screen, means including a frame saw tooth generator under control of said received frame synchronizing pulses to produce frame saw tooth waves for deflecting the electron ray forward and backward vertically to scan successive frames on said screen to produce images thereon from the said received picture signals, said line saw tooth generator comprising a condenser repeatedly charged through an impedance from a source of current, a first electron tube connected to said impedance, and means including at least two electron control tubes responsive to changes in amplitude of said line saw tooth waves to control current flow through said first tube thereby varying the current through said impedance to maintain the forward horizontal speed of the electron ray substantially constant.

7. A television system as claimed in claim 5 wherein the electron ray is directed at an angle toward said screen and in addition there is provided means including an electron tube under control of said line and said frame saw tooth waves to cause the electron ray to scan lines of equal length on said screen.

8. A television system as claimed in claim 5 and in addition there is provided a coupling between said second and said first auxiliary scanning devices to cause said frame pulses to control the last line saw tooth wave for each scanned frame to interlock line and frame scanning actions.

9. In a television system, means to receive line synchronizing control signals and frame synchronizing control signals, a plurality of cathode ray tubes each having an image screen and an electron ray directed toward its associated image screen, a condenser repeatedly charged through a first impedance from a source of current under control of said line control signals to produce line saw tooth waves for deflecting the electron ray in each of the said tubes forward and backward horizontally across said screens, a first electron tube connected to said impedance, means including a first pair of control tubes under control of said line saw tooth waves to control the current through said first electron tube to in turn control the charging current to said condenser for maintaining the forward horizontal speed of the electron ray constant, a frame condenser repeatedly charged through a second impedance from said source of current under control of said frame control signals to produce frame saw tooth waves for deflecting the electron ray in each of the said cathode ray tubes forward and backward vertically to scan the said image screens, a second electron tube connected to said second impedance and means including a second pair of control tubes under control of said said frame saw tooth waves to control the current through said second electron tube to in turn control the charging current to said frame condenser for maintaining the forward vertical speed of the electron ray constant.

10. In a television system, a cathode ray tube having an image screen and an electron ray directed at an angle toward the screen, a field signal cathode ray tube having a field signal screen comprising a field photo-electric tube disposed at one end thereof and coated with fluorescent material with an electron ray capable of impinging the photo-electric tube to produce spaced field control signals, a line signal cathode ray tube having a line signal screen comprising a first line photo-electric tube disposed intermediate the ends of said line screen and a second line photo-electric tube disposed at one end thereof, each of the said photo-electric tubes coated with fluorescent material and an electron ray capable of impinging said first and second line photo-electric tubes to produce groups of line control signals intermediate said field signals with a different interval between the first line signal and a field signal in intermediate groups than the interval between the first line signal and a field signal in alternate groups, means under control of said line signals to produce horizontal saw tooth waves to deflect the electron ray horizontally across said mosaic screen, means under control of said field signals to produce vertical saw tooth waves to deflect the electron ray vertically to scan different lines on said mosaic screen in alternate and intermediate fields, and means including an electron tube having at least two control grids, one grid controlled by said horizontal saw tooth waves and the other grid controlled by said vertical saw tooth waves to cause the electron ray to scan lines of equal length on said screen.

JOHN H. HOMRIGHOUS.

REFERENCES CITED

The following references are of record in the file of this patent:

UNITED STATES PATENTS

| Number | Name | Date |
|---|---|---|
| 1,794,103 | Cubite | Feb. 24, 1931 |
| 2,100,279 | George | Nov. 23, 1937 |
| 2,126,243 | Busse | Aug. 9, 1938 |
| 2,132,655 | Smith | Oct. 11, 1938 |
| 2,137,039 | Vance | Nov. 15, 1938 |
| 2,172,728 | Bruche | Sept. 12, 1939 |
| 2,176,973 | Manifold | Oct. 24, 1939 |
| 2,192,121 | Bedford | Feb. 27, 1940 |
| 2,201,309 | Goldsmith | May 21, 1940 |
| 2,207,389 | Wendt | July 9, 1940 |
| 2,237,640 | Urtel | Apr. 8, 1941 |
| 2,241,586 | Dorsman | May 13, 1941 |
| 2,246,625 | Farnsworth | June 24, 1941 |
| 2,277,000 | Bingley | Mar. 17, 1942 |
| 2,284,714 | Bedford | June 2, 1942 |
| 2,293,147 | Kell | Aug. 18, 1942 |
| 2,299,471 | Du Mont | Oct. 20, 1942 |
| 2,301,199 | Bruce | Nov. 10, 1942 |
| 2,301,374 | Cox | Nov. 10, 1942 |
| 2,304,057 | Schade | Dec. 1, 1942 |
| 2,320,699 | Homrighous | June 1, 1943 |
| 2,335,180 | Goldsmith | Nov. 23, 1943 |
| 2,350,536 | Schlesinger | June 6, 1944 |
| 2,351,889 | Strubig | June 20, 1944 |
| 2,398,641 | Homrighous | Apr. 16, 1946 |
| 2,398,642 | Homrighous | Apr. 16, 1946 |
| 2,403,975 | Graham | July 16, 1946 |
| 2,404,839 | Hammond | July 30, 1946 |
| 2,437,027 | Homrighous | Mar. 2, 1948 |
| 2,454,651 | Homrighous | Nov. 23, 1948 |

FOREIGN PATENTS

| Number | Country | Date |
|---|---|---|
| 315,362 | Great Britain | Feb. 12, 1931 |
| 388,370 | Great Britain | Feb. 14, 1933 |
| 474,776 | Great Britain | Mar. 24, 1937 |
| 109,263 | Australia | Nov. 30, 1939 |
| 604,647 | Germany | Oct. 25, 1934 |

OTHER REFERENCES

Wilson: "Television Engineering," pages 317 to 354. Published in 1937 by Sir Isaac Pitman and Son, Ltd., London, England.